(12) United States Patent
Budnahatti Veerabhadrappa et al.

(10) Patent No.: US 12,164,968 B1
(45) Date of Patent: Dec. 10, 2024

(54) MAGNIFYING RESOURCES FOR A LOCATION

(71) Applicant: Citibank, N.A., New York, NY (US)

(72) Inventors: Shashikiran Budnahatti Veerabhadrappa, New York, NY (US); Tuan Dao, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/653,936

(22) Filed: May 2, 2024

Related U.S. Application Data

(63) Continuation-in-part of application No. 18/114,445, filed on Feb. 27, 2023.

(51) Int. Cl.
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| | | | | |
|---|---|---|---|---|
| 9,438,466 | B1 * | 9/2016 | O'Gorman | H04L 69/329 |
| 11,004,010 | B2 * | 5/2021 | Hillard | G06Q 40/08 |
| 11,816,610 | B2 * | 11/2023 | Yates | G06Q 10/06393 |
| 11,829,627 | B2 * | 11/2023 | Roberts | G06F 3/0625 |
| 11,843,546 | B1 * | 12/2023 | Rule | H04L 47/822 |
| 11,910,249 | B2 * | 2/2024 | Gupta | H04L 41/16 |
| 11,922,448 | B2 * | 3/2024 | Dao | G06Q 30/0255 |
| 11,954,532 | B2 * | 4/2024 | Daniels | G06F 9/5038 |
| 12,021,755 | B2 * | 6/2024 | Sesha | H04L 41/5022 |
| 2014/0372193 | A1 | 12/2014 | Jorgensen et al. | |
| 2016/0196577 | A1 | 7/2016 | Reese et al. | |
| 2021/0012311 | A1 | 1/2021 | Storiale et al. | |
| 2021/0352179 | A1 | 11/2021 | Auer et al. | |
| 2021/0365977 | A1 | 11/2021 | Zarakas et al. | |
| 2022/0207554 | A1 | 6/2022 | Dao et al. | |
| 2022/0309525 | A1 * | 9/2022 | Thekknedath | G06Q 30/0201 |
| 2022/0358487 | A1 | 11/2022 | Garner et al. | |
| 2022/0413941 | A1 * | 12/2022 | Ramtekkar | G06F 9/5022 |
| 2023/0089937 | A1 * | 3/2023 | Singh | G06Q 20/405 705/64 |
| 2023/0117893 | A1 * | 4/2023 | Durvasula | G06N 20/00 706/12 |

(Continued)

OTHER PUBLICATIONS

Office Action Non-Final dated Jun. 8, 2023, issued in U.S. Appl. No. 18/114,445 from the U.S. Patent and Trademark Office.

(Continued)

*Primary Examiner* — Hiren P Patel
(74) *Attorney, Agent, or Firm* — Perkins Coie LLP

(57) ABSTRACT

Methods and systems are described herein for generating and assigning resources based on timestamps. A plurality of permission messages associated with a plurality of authorization events may be received with each permission message including an authorization timestamp indicating a generation time of a corresponding permission message. In addition, a plurality of data records may be received with each data record including a corresponding plurality of parameters. Based on the permission messages and the data records, a resource multiplier is generated, and resources assigned to each data record are multiplied based on the resource multiplier.

20 Claims, 3 Drawing Sheets

(56) References Cited

U.S. PATENT DOCUMENTS

| | | | | |
|---|---|---|---|---|
| 2023/0161625 A1* | 5/2023 | duPont | ................ | G06Q 20/405 |
| | | | | 718/104 |
| 2023/0267009 A1* | 8/2023 | Narayanan | ............ | H04L 67/133 |
| 2023/0367646 A1* | 11/2023 | England | ................ | G06Q 20/405 |
| 2023/0367992 A1* | 11/2023 | Chakravarthy | ..... | G06F 18/2413 |
| 2024/0036928 A1* | 2/2024 | Donthi | ................... | G06N 20/20 |

OTHER PUBLICATIONS

Office Action Non-Final dated Sep. 20, 2023, issued in U.S. Appl. No. 18/114,445 from the U.S. Patent and Trademark Office.

* cited by examiner

MAGNIFYING RESOURCES FOR A LOCATION

This application is a continuation-in-part of U.S. patent application Ser. No. 18/114,445, filed Feb. 27, 2023. The content of the foregoing application is incorporated herein in its entirety by reference.

BACKGROUND

With the advent of cloud computing, resource generation and allocation have become increasingly important. Cloud computing systems may include a large number of computing devices that have various combinations of memory, processors, disk space, etc. Those resources may be pre-allocated or allocated on demand to hosted applications or tasks being performed in the cloud. Although cloud computing systems have vast resources to be allocated, those resources are still limited because of the large number of applications that now reside in the cloud. Accordingly, systems of assigning those resources to various tasks and applications have become more and more complex. In many instances, the assigned resources are not enough to efficiently execute an application or a workload.

SUMMARY

Accordingly, systems and methods are described herein for generating and assigning resources and resource magnifiers based on resource intensive events. A resource allocation system may be used for generating and assigning resources based on resource intensive events. The resource allocation system may receive a plurality of permission messages associated with a plurality of actions. Each permission message of the plurality of permission messages may be associated with a corresponding user action. For example, a permission message may be a request to allocate a particular amount of memory to a user of an application for a particular action or task. In large cloud systems, there may be hundreds or thousands of permission messages. Different applications may send different permission messages for approval of resource usage during a particular time frame (e.g., within 10, 20, or 30 minutes of each other). In some embodiments, different permission messages may be received for allocating different resources (e.g., memory, processor(s), disk space, etc.).

The resource allocation system may then attempt to determine any resource intensive events (e.g., periodically or based on a trigger) in order to head off any resource bottlenecks. Thus, the resource allocation system may input the plurality of permission messages into a first machine learning model to obtain one or more resource intensive events. The first machine learning model may be one that has been trained to identify, based on permission messages, resource intensive events. Furthermore, each resource intensive event may be associated with a corresponding location. For example, a resource intensive event may be associated with a computer system, a computer subsystem, or a computer resource. That is, a particular computer system may require application resources for multiple applications that are asking permission to use memory, a processor, and/or a disk. Thus, the machine learning model may predict which computer system, computer subsystem, and/or resource are associated with the resource intensive event.

In some embodiments, there may be one or multiple indicators of resource intensive events obtained by the resource allocation system from the machine learning model. Thus, the resource allocation system may determine, based on the one or more resource intensive events, one or more locations associated with the one or more resource intensive events. For example, the resource allocation system may receive indications of one or more computer systems that are associated with intensive events. In some embodiments, the locations may be specific memories, specific processor(s), and/or storage devices.

The resource allocation system may then determine, based on user device data, a plurality of users associated with a first resource intensive event of the one or more resource intensive events. For example, the resource allocation system may determine users who are using a particular application, a particular computing device, a particular resource, etc. That is, the resource allocation system may identify the users who are using the resources associated with the determined location.

The resource allocation system may then determine whether the users would be predicted to switch to a different system. Thus, the resource allocation system may input user data associated with the plurality of users into a second machine learning model to obtain a subset of users who are predicted to switch from a first permission token to a second permission token. The second machine learning model may be one that is trained to identify, based on received user data, whether a user is predicted to switch from one permission token to another permission token. For example, a permission token may be a token that gives the resource allocation system permission to switch the user to a different resource, such as a different computing system, a different application, and/or a different resource. Thus, the resource allocation system may receive from the machine learning model user identifiers of users who are predicted to switch if prompted.

The resource allocation system may then transmit to a plurality of client devices associated with the plurality of users a request to switch from the first permission token to the second permission token. The request may include a corresponding resource multiplier. For example, the resource allocation system may transmit a request to a device associated with each user to switch to another computing device, resource, etc. The request may include a resource multiplier indicating how much more resources would be available if the user switches to the second permission token.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

Figure 1:
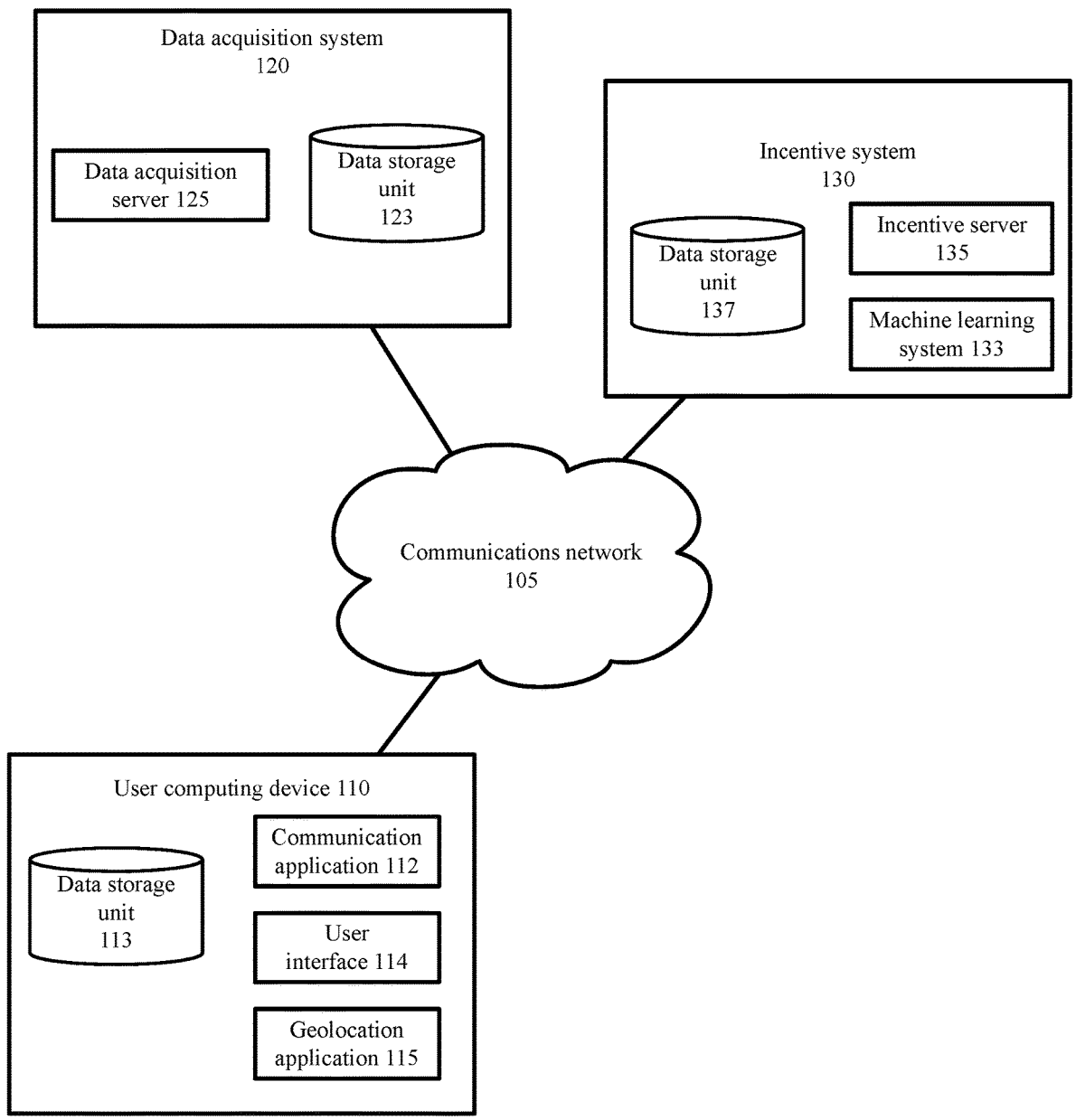
FIG. 1 illustrates a block diagram depicting a portion of a communications and processing architecture of a typical system, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

In some embodiments, a resource allocation system may perform the following operations for causing a permission token switch. The resource allocation system may receive a plurality of permission messages associated with a plurality of actions. Each permission message of the plurality of permission messages may be associated with a corresponding user action. As discussed above, the permission messages may be messages for resources (e.g., resource allocation requests). For example, users may perform particular operations with regard to one or more applications being executed. Those operations may require extra resources such as memory, processing power, computing systems, etc. Thus, the resource allocation system may receive those requests referred to as permission messages. In some embodiments, the disclosed operations may be used in a financial context. For example, permission messages may be credit card or other bank card authorization messages for purchasing items at an event. Thus, a user action may be a purchase of an item with an authorization message being a credit card transaction or a credit card authorization. The financial embodiment is discussed further in this disclosure.

The resource allocation system may include software, hardware, or a combination of both. For example, the resource allocation system may be computer code being executed using one or more processors and may use memory and disk space, as will be described below. Furthermore, each machine learning model may be a machine learning system or algorithm that will be described below.

The resource allocation system may then use machine learning to identify any resource intensive events. In particular, the resource allocation system may input the plurality of permission messages into a first machine learning model to obtain one or more resource intensive events. The first machine learning model may be one that has been trained to identify, based on permission messages, resource intensive events. Furthermore, each resource intensive event may be associated with a corresponding location. For example, the machine learning model may have been trained using a training dataset to identify one or more locations corresponding to resource intensive events. The locations may be various computer systems, memory arrays, processor arrays, and/or other suitable locations. The training datasets may include a target feature of a location and supporting features on which the target feature depends. Thus, the supporting features may be used to predict the target feature. Machine learning models and algorithms including training are discussed further in this disclosure. In some embodiments, the first machine learning model may output predictions of resource intensive events. The predictions may be computing systems, memory systems, processing systems, and/or others. As discussed above, the disclosed operations may be used in a financial embodiment. Accordingly, the first machine learning model may predict locations (e.g., physical locations) where there is a large number of users who are purchasing products. Accordingly, the machine learning model may be trained to identify locations (e.g., based on credit card data within the permission messages) with high spending events. The financial embodiment is discussed further in this disclosure.

The resource allocation system may then determine, based on the one or more resource intensive events, one or more locations associated with the one or more resource intensive events. For example, the resource allocation system may drop locations with a prediction probability lower than a threshold and generate a list of locations that are within a threshold. For example, a threshold may be 50%, 60%, or another suitable percentage. In some embodiments, a resource intensive event may be a high spend event. The financial embodiment is discussed further in this disclosure.

The resource allocation system may then determine, based on user device data, a plurality of users associated with a first resource intensive event of the one or more resource intensive events. As discussed above, the resource allocation system may determine users associated with applications that have requested extra resources. For example, the resource allocation system may query user devices for application data. Alternatively, or additionally, the data may be received from the user devices periodically. In the financial embodiment, the user data may be used to identify users who are within a certain distance of the location of the resource intensive event sometimes referred to as a high spend event. For example, a user device location may be used to determine users within the certain distance. The financial embodiment is discussed further in this disclosure.

The resource allocation system may then use a machine learning model to identify users who may switch tokens if prompted. The resource allocation system may input user data associated with the plurality of users into a second machine learning model to obtain a subset of users who are predicted to switch from a first permission token to a second permission token. The second machine learning model may be one that is trained to identify, based on received user data, whether a user is predicted to switch from one permission token to another permission token. As discussed above, the second machine learning model may use user data to determine whether a user is predicted to switch to another set of application resources. In a financial embodiment, the user tokens may be electronic data representing a credit card package that may be used to purchase items using an electronic terminal that can read a credit card. Accordingly, in the financial embodiment, the resource allocation system may identify users at a high spend event who would be willing to switch to another credit card. In return, the user may receive an incentive such as points, rewards, currency, etc. The financial embodiment is discussed further in this disclosure.

The resource allocation system may then transmit to a plurality of client devices associated with the plurality of users a request to switch from the first permission token to the second permission token. The request may include a corresponding resource multiplier. For example, the resource allocation system may transmit to the user device a request that includes a prompt to switch the user's application and/or other resources based on the tokens. In a financial embodiment, the resource allocation system may transmit, to a user, an offer to switch to a particular credit card to make purchases at the high spend event. The offer may include an incentive for the switch from one credit card to another.

The resource allocation system may perform the following operations when inputting the plurality of permission messages into the first machine learning model to obtain the one or more resource intensive events. The resource allocation system may extract, from the plurality of permission messages, a plurality of timestamps and a corresponding plurality of location identifiers. For example, every credit card authorization may include an address, or another suitable location associated with a vendor or a merchant.

In some embodiments, the resource allocation system may use a clustering machine learning model to identify locations. In particular, the resource allocation system may execute the first machine learning model on the plurality of timestamps and the corresponding plurality of location identifiers. The first machine learning model may cluster each entry according to a combination of a timestamp and a location. For example, the machine learning model may output one or more clusters corresponding to the locations within the permission messages. In the financial embodiments, as discussed below, the first machine learning model may receive, as input, locations of credit card authorizations and may output one or more locations of high spend events. Accordingly, the first machine learning model may output one or more time periods and locations associated with a corresponding cluster such that each cluster represents a resource intensive event. In some embodiments, the output may include a probability or another score representing the likelihood of the resource intensive event.

In some embodiments, the resource allocation system may determine, based on the user device locations, the plurality of users associated with the first resource intensive event of the one or more resource intensive events using the below operations. The resource allocation system may retrieve cluster data for a first cluster of the one or more clusters. For example, the resource allocation system may select a first cluster identifier and retrieve cluster data associated with the cluster identifier. The cluster data may include a location and a time period. The location may be an address or a global positioning system location. The time period may be a duration of the event or a start time and an end time of the event.

The resource allocation system may then determine, based on the cluster data, a cluster area associated with the first cluster. For example, for different types of clusters, the cluster area may be different. For example, if the cluster is associated with a computer system, the cluster area may include various components of the computer system. However, if the cluster is associated with memory, the cluster area may include memory modules. In financial embodiments, the cluster area may be determined based on the various card authorizations. For example, if the credit card authorizations are within a particular radius, the resource allocation system may set a radius within that area.

The resource allocation system may then identify, based on an event database, an event within the cluster area. For example, the event may be a new application installation or an installation update. The database may be a change control database that stores changes and associated components (e.g., computing system, processor arrays, etc.). In a financial example, the resource allocation system may iterate through a database (e.g., a database table of events) and compare the location of the event (e.g., an address, GPS coordinates, etc.) to the locations within the database to identify an event. For example, the event may be a concert, a sports game, or another suitable event.

The resource allocation system may then determine, based on event data associated with the event, a time interval associated with the event. For example, the database may store event data and a time frame for the event. That is, a database may store a time frame when an application is being upgraded or deployed, thus indicating how long the resource intensive event is going to last. In a financial embodiment, the resource allocation system may retrieve a start and stop time of a particular event such as a concert, a sporting event, etc.

Based on determining that the event has not ended, the resource allocation system may identify a plurality of user devices associated with the cluster area. In some embodiments, the resource allocation system may identify user devices present within the cluster area. For example, the resource allocation system may identify user devices using an application that is being upgraded. In financial embodiments, the resource allocation system may determine users within the threshold distance of the first resource intensive event (e.g., within a stadium, concert hall, or within a threshold distance of the event).

In some embodiments, the resource allocation system may use the second machine learning model to predict a resource multiplier that may cause a particular user or users to switch to the second permission token. In particular, the resource allocation system may receive, from the second machine learning model for each user who is predicted to switch from the first permission token to the second permission token, a corresponding resource multiplier threshold for switching from the first permission token to the second permission token. For example, in financial embodiments, the resource allocation system may determine an incentive for the user to switch from one credit card to another for payment. The incentive may be increasing a number of points earned, giving a discount, or another suitable incentive. The incentive may be determined by the second machine learning model based on user history and/or other data, which may have been used to train the machine learning model.

The resource allocation system may then generate the corresponding resource multiplier for each user for a period of time associated with a resource intensive event of the one or more resource intensive events. For example, the resource allocation system may generate the incentive for the user to switch credit cards. The resource allocation system may add the corresponding resource multiplier to each indication. That is, the resource allocation system may add the incentive to each indication so that the user is able to understand what rewards the user may receive by switching from one credit card to another or generally use the credit card associated with the incentive.

In some embodiments, the resource allocation system may determine for each user a type of incentive for switching from one permission token to another. In particular, the resource allocation system may receive, from the second machine learning model for each user who is predicted to switch from the first permission token to the second permission token, a corresponding resource type threshold for switching from the first permission token to the second permission token. For example, the second machine learning model may predict that the user may switch if given a discount on the item, a certain number of credit card points, or another suitable reward/incentive type. The resource allocation system may then generate a corresponding resource type for each user for the period of time associated with the resource intensive event. For example, some users may be predicted to prefer a first resource type (e.g., a discount), while some other users may be predicted to prefer a second resource type (e.g., more credit card points). The resource allocation system may then add the corresponding resource type to each corresponding.

In some embodiments, the resource allocation system may continue training the machine learning models as the system is live. In particular, the resource allocation system may receive, for one or more users of the plurality of users, user switch data indicating whether the one or more users switched from the first permission token to the second permission token. For example, as users complete purchases, the resource allocation system may receive permission tokens (e.g., credit cards and credit card authorizations). The resource allocation system may then determine, for each user of the one or more users, a corresponding resource multiplier threshold and a corresponding resource type. For example, the resource allocation system may perform a lookup of a points increase or another incentive given to the user, as well as the type of incentive (e.g., points multiplier, a discount, etc.). The resource allocation system may then generate a training dataset that includes, for each user, the corresponding resource multiplier, the corresponding resource type, and whether each user switched from the first permission token to the second permission token. For example, the training dataset may have a target variable of whether each user switched and the supporting variables indicating the incentive and/or other data. The resource allocation system may then retrain the second machine learning model using the training dataset.

Financial Embodiments

The embodiments disclosed herein can utilize machine learning to allow payment instrument institutions to identify users who are most likely to switch payment instruments and use machine learning to identify the time and geolocation of high spend events during which an offer should be presented to the identified users, as further defined below.

In one aspect, technologies herein provide methods to use machine learning systems to analyze internal and/or external customer data to identify individuals who are most likely to switch payment instrument usage from another issuer based on received incentives. The methods further include machine learning systems to identify the time and geolocation of high spend events. The methods include providing incentives to a user that is likely to switch payment instruments before or during a high spend event to induce a switch to a payment instrument associated with the incentive. The incentives are provided via notification on a user computing device. The incentives have geofences providing a boundary that substantially encompasses the high spend event and a time limit associated with the high spend event.

The machine learning systems use transaction data from a vast number of users of payment instruments, geolocation data of users, ticket purchase data, user histories, social media data, credit card acquirer data, and other third party and internal data to create models that can identify the users and the high spend events. Because of the immense amount of data that is acquired, processed, and categorized, any number of human users would be unable to create the predictive models or perform the operations described herein.

This invention represents an advance in computer engineering and a substantial advancement over existing practices. The data acquired to prepare the predictive models are technical data relating to transactions, geolocations, and other data. The outputs of the machine learning systems are not obtainable by humans or by conventional methods. Identifying both users that are likely to switch payment instruments at a high spend event, identifying high spend events based on the acquired data, and combining these outputs creates a predictive system to present real-time flash incentives to users who are most likely to switch payment instruments during the occurrence of a high spend events is a non-conventional, technical, real-world output and benefit that is not obtainable with conventional systems.

Standard techniques related to making and using aspects of the invention may or may not be described in detail herein. Various aspects of computing systems and specific computer programs to implement the various technical features described herein are well known.

1. Example System Architectures

Turning now to the drawings, in which like numerals represent like (but not necessarily identical) elements throughout the figures, example embodiments are described in detail.

FIG. 1 is a block diagram depicting a system 100 to offer real-time incentives for purchases with a payment instrument within specified geographic and time limits. In one example embodiment, a user associated with a user computing device 110 must install an application, and or make a feature selection to obtain the benefits of the techniques described herein.

As depicted in FIG. 1, the system 100 includes network computing devices/systems 110, 120, and 130 that are configured to communicate with one another via one or more networks 105 or via any suitable communication technology.

Each network 105 includes a wired or wireless telecommunication means by which network devices/systems (including devices 110, 120, and 130) can exchange data. For example, each network 105 can include any of those described herein such as the network 2080 described in FIG. 3 or any combination thereof or any other appropriate architecture or system that facilitates the communication of signals and data. Throughout the discussion of example embodiments, the terms "data" and "information" are used interchangeably herein to refer to text, images, audio, video, or any other form of information that can exist in a computer-based environment. The communication technology utilized by the devices/systems 110, 120, and 130 may be similar networks to network 105 or an alternative communication technology.

Each network computing device/system 110, 120, and 130 includes a computing device having a communication module capable of transmitting and receiving data over the network 105 or a similar network. For example, each network device/system 110, 120, and 130 can include any computing machine 2000 described herein and found in FIG. 3 or any other wired or wireless, processor-driven device. In the example embodiment depicted in FIG. 1, the network devices/systems 110, 120, and 130 are operated by user, data acquisition system operators, and incentive system operators, respectively.

The user computing device 110 includes a user interface 114. The user interface 114 may be used to display a graphical user interface and other information to the user to allow the user to interact with the data acquisition system 120, the incentive system 130, and others. The user interface 114 receives user input for data acquisition and/or machine learning and displays results to user. In another example embodiment, the user interface 114 may be provided with a graphical user interface by the data acquisition system 120 and or the incentive system 130. The user interface 114 may be accessed by the processor of the user computing device 110. The user interface display 114 may display a webpage associate with the data acquisition system 120 and/or the incentive system 130. The user interface 114 may be used to provide input, configuration data, and other display direction by the webpage of the data acquisition system 120 and/or the incentive system 130. In another example embodiment, the user interface 114 may be managed by the data acquisition system 120, the incentive system 130, or others. In another example embodiment, the user interface 114 may be managed by the user computing device 110 and be prepared and displayed to the user based on the operations of the user computing device 110.

The user can use the communication application 112 on the user computing device 110, which may be, for example, a web browser application or a stand-alone application, to view, download, upload, or otherwise access documents or web pages through the user interface 114 via the network 105. The user computing device 110 can interact with the web servers or other computing devices connected to the network, including the data acquisition server 125 of the data acquisition system 120 and the incentive server 135 of the incentive system 130. In another example embodiment, the user computing device 110 communicates with devices in the data acquisition system 120 and/or the incentive system 130 via any other suitable technology, including the example computing system described below. In an example, the communication application 112 is an application for managing an account of the user at a payment instrument institution associated with the incentive system 130. For example, the communication application 112 may be used to conduct transactions, manage account settings, receive incentives, manage incentives, accept incentives, or perform any other suitable tasks associated with the payment instrument account.

The user computing device 110 also includes a geolocation application 115. The geolocation application 115 may be any type of application, hardware, or software on the user computing device 110 that allows the data acquisition system 120 or the incentive system 130 to identify a location of the user computing device 110. The user may be required to enable the geolocation application 115 to allow access to the geolocation data. The user may be required to grant permission to the data acquisition system 120 or the incentive system 130 to view or access the geolocation data before any geolocation data is transferred. The geolocation application 115 may utilize any suitable system for determining location of the user computing device 110, such as a Global Positioning System, Wi-Fi locations, cellular locations, or any other suitable technology.

The user computing device 110 also includes a data storage unit 113 accessible by the user interface 114, the communication application 112, or other applications. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In another example embodiments, the data storage unit 113 may reside in a cloud-based computing system.

An example data acquisition system 120 comprises a data storage unit 123 and an acquisition server 125. The data storage unit 123 can include any local or remote data storage structure accessible to the data acquisition system 120 suitable for storing information. The data storage unit 123 can include one or more tangible computer-readable storage devices, or the data storage unit 123 may be a separate system, such as a different physical or virtual machine or a cloud-based storage service.

In one aspect, the data acquisition server 125 communicates with the user computing device 110 and/or the incentive system 130 to transmit requested data. The data may include any suitable data used for training a machine learning algorithm as described herein.

An example incentive system 130 comprises a machine learning system 133, an incentive server 135, and a data storage unit 137. The incentive server 135 communicates with the user computing device 110 and/or the data acquisition system 120 to request and receive data. The data may comprise the data types previously described in reference to the data acquisition server 125 and described herein.

The machine learning system 133 receives an input of data from the incentive server 135. The machine learning system 133 can comprise one or more functions to implement any of the mentioned training methods described herein. In an example, the machine learning program used by the machine learning system 133 may comprise a support vector machine, a naïve bayes algorithm, a neural network, a random forest algorithm, or any other suitable machine learning algorithm. The suitable machine learning algorithms are discussed in greater detail herein. In other examples, artificial intelligence systems may use processes such as fuzzy logic or complex dependency parsing techniques. Any suitable architecture may be applied to identify users that would be likely to be receptive to incentives, provide incentives to these users that are relevant to the user activities, and to provide the incentives in a manner that the user likely to acknowledge and utilize the incentives.

The data storage unit 137 can include any local or remote data storage structure accessible to the incentive system 130 suitable for storing information. The data storage unit 137 can include one or more tangible computer-readable storage devices, or the data storage unit 137 may be a separate system, such as a different physical or virtual machine or a cloud-based storage service.

In an alternate embodiment, certain ones of the functions of either or both of the data acquisition system 120 and the incentive system 130 may be performed by the user computing device 110.

It will be appreciated that the network connections shown are examples, and other means of establishing a communications link between the computers and devices can be used. Moreover, those having ordinary skill in the art having the benefit of the present disclosure will appreciate that the user computing device 110, data acquisition system 120, and the incentive system 130 illustrated in FIG. 1 can have any of several other suitable computer system configurations. For example, a user computing device 110 embodied as a mobile phone or handheld computer may not include all the components described above.

Figure 3:
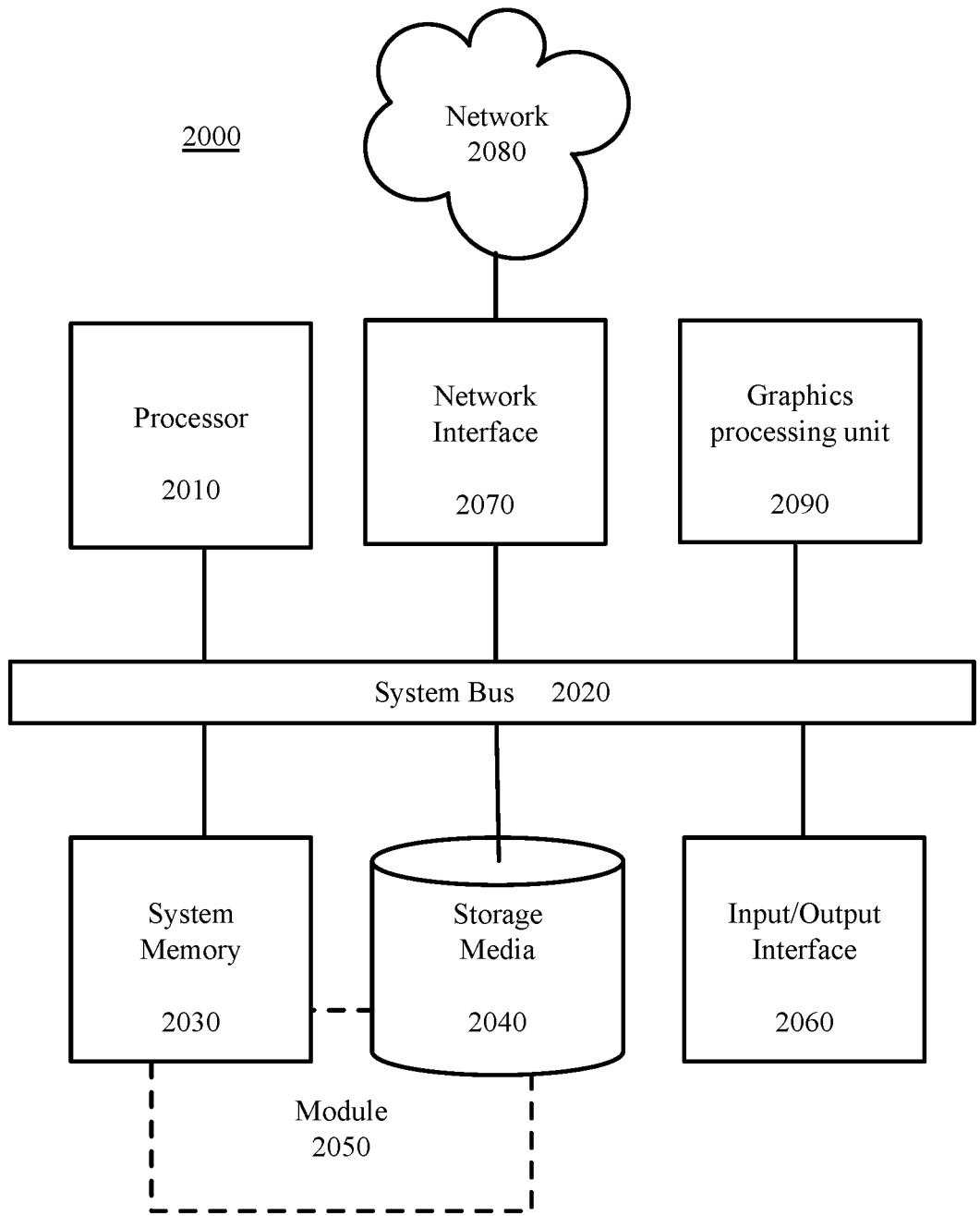
FIG. 3 illustrates a block diagram depicting a computing machine and modules, in accordance with one or more embodiments of this disclosure.

In example embodiments, the network computing devices and any other computing machines associated with the technology presented herein may be any type of computing machine such as, but not limited to, those discussed in more detail with respect to FIG. 3. Furthermore, any modules associated with any of these computing machines, such as modules described herein or any other modules (scripts, web content, software, firmware, or hardware) associated with the technology presented herein may by any of the modules discussed in more detail with respect to FIG. 3. The computing machines discussed herein may communicate with one another as well as other computer machines or communication systems over one or more networks, such as network 105. The network 105 may include any type of data or communications network, including any of the network technology discussed with respect to FIG. 3.

2. Example Processes

Figure 2:
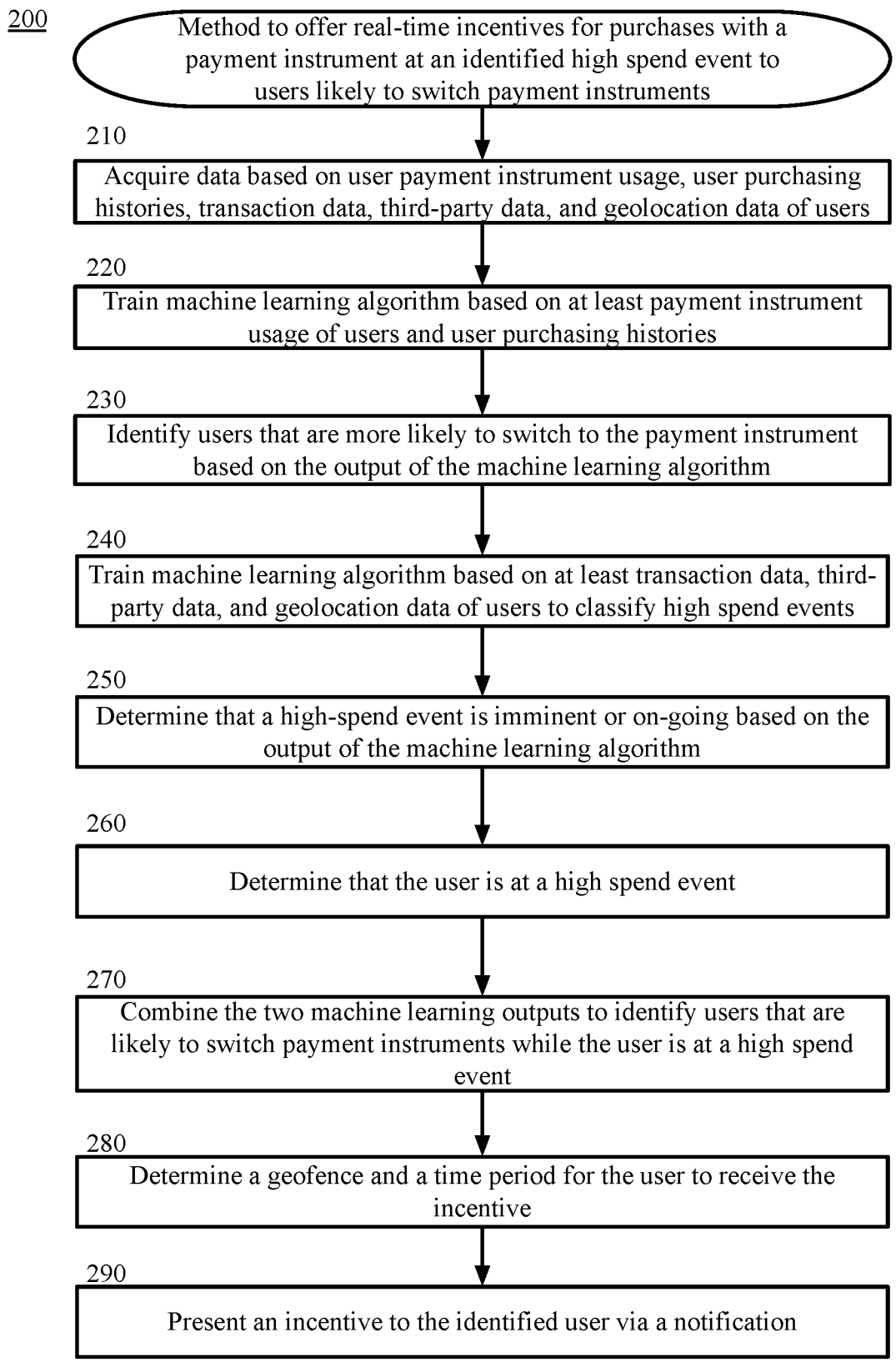
FIG. 2 illustrates a block flow diagram, in accordance with one or more embodiments of this disclosure.

The example methods illustrated in FIG. 2 is described hereinafter with respect to the components of the example architecture 100. The example methods also can be performed with other systems and in other architectures including similar elements.

Referring to FIG. 2, and continuing to refer to FIG. 1 for context, a block flow diagram illustrates methods 200 to offer real-time incentives for purchases with a payment instrument to an identified high spend event to users likely to switch payment instruments, in accordance with certain examples of the technology disclosed herein.

In block 210, the data acquisition system 120 acquires data based on payment instrument usage of users and user purchasing histories. The data acquisition system 120 may obtain the data from any suitable provider, third-party provider, user computing device 110, merchant, social media platform, or any other suitable database or compiler of user data. In examples, the data may include user spending histories with the payment instrument associated with the payment instrument institution. The data may include user spending history with other payment instruments associated with other payment instrument institutions. The data may include data from third parties such as credit card acquirers or merchants. The data may include data from all of the users of a payment instrument institution or of a social media network. In practice, this may include millions of users each conducting hundreds of transactions and other interactions.

The data may include a payment instrument utilized by a user for each type of transaction. For example, a merchant category code for each product purchased may be associated with the type of payment instrument used for each type of transaction. For example, the data acquisition system 120 may obtain data that a user purchased gas with a particular payment instrument five times in the previous month. The data acquisition system 120 may determine that a user purchased movie tickets with a different payment instrument twice in the last month. The data acquisition system 120 may determine that the user switched to a particular payment instrument at a time that the particular payment instrument institution instituted a new incentive program.

The data acquisition system 120 acquires third-party data relating to user and merchant transactions. The third-party data may be related to merchants, merchant transactions, event locations, event times, event durations, ticket purchases, spending histories of users at events or at merchants, geolocation of merchants and events, or any other suitable data.

The third-party data may be acquired from any suitable source, such as credit card acquirers, financial institutions, ticket sale organizations, search engines, information aggregators, social media organizations, news outlets, websites, or any other suitable source.

The data acquisition system 120 acquires internal data related to transactions, ticket purchases, entertainment events such as rock concerts and shows, concentrated shopping mall purchases from multiple stores, hotel reservations, flight information, and restaurant, bar, food and drink purchases.

The data acquisition system 120 gathers geolocation data for the one or more users. The geolocation data may be obtained from a geolocation application 115 on user computing devices 110 or from geolocation data server. For example, the data may be obtained from a cellular phone provider that maintains a database of phone locations. The geolocation application 115 may utilize any suitable system for determining location of the user computing device 110, such as a Global Positioning System, Wi-Fi locations, cellular locations, or any other suitable technology.

In an example, this data may include the geolocation histories of millions of users of a cellular provider. In another example, this data may include all of the tens of thousands of ticket purchases for each of thousands of sporting events in a regional area.

The data acquisition system 120 may acquire this type of data and other related data about the user and any other users. The data acquisition system 120 may acquire any type of data associated with the transactions, such as the date, the time of day, the type of merchant, the type of card used, the incentives provided for each transaction, or any other suitable data.

In block 220, the incentive system 130 trains the machine learning algorithm of the machine learning system 133 based on at least payment instrument usage of users and user purchasing histories.

As described in the Machine Learning section below, the data stored by the data acquisition system 120 is used to train the machine learning algorithm to create a predictive model of the actions of users.

The machine learning system 130 imports or otherwise receives the data from the data acquisition system 120. The data is fed into the machine learning algorithm or otherwise provided as training data to the machine learning algorithm. As described herein, the data is processed and categorized by the machine learning algorithm. For example, user transactions may be analyzed to extract particular data groups in each transaction, such as by extracting or categorizing them by dollar amounts, merchant categories, dates, or any other categories. Further, the ML algorithm may also extract non-trivial characteristics linking the data. For example, the input data to a neural network eventually becomes weights used by equations in nodes. Therefore, the neural network "learns" indescribable patterns between input.

In an example, the machine learning algorithm determines relationships between stimuli provided to a user and the actions the user will take. As described herein, different machine learning algorithms may be tested to determine which type of machine learning algorithm provides the most accurate predictions or results. For example, the results may be tested by comparing predicted results of which users are likely to switch payment instruments to historical data of which users actually switched payment instruments in a given time period. The machine learning algorithm may deploy the model or algorithm selected for usage in real time based on the results of the testing. The results of the usage may be fed back to the machine learning algorithm to allow for adjustments to the selected algorithm. As additional results are received from user payment histories, the model may be adjusted to better fit the data and thus make more accurate predictions.

The details of the method to train the machine learning algorithm are described in greater detail in the Machine Learning section below. In the examples herein, different machine learning algorithms utilized may include, but are not limited to, support vector machines, naive Bayes, neural networks, gradient boosting machines, random forests, and an ensemble of multiple algorithms. These algorithms are discussed in greater detail below.

Based on the data associated with the user, the predictive model may be used to predict how the user will react to certain stimuli. For example, the model may predict how a user will react to being provided with an incentive related to a payment instrument. The model may predict how a user will react in certain circumstances, such as during a high spend event or at a social function. The machine learning algorithm may be based on any of the suitable machine learning or artificial intelligence processes described herein.

In block 230, the machine learning system 130 identifies users that are more likely to switch to the payment instrument based on the output of the machine learning algorithm. After the machine learning algorithm has created one or more models, the machine learning system 130 identifies how a user will react to specific scenarios. For example, the machine learning algorithm will predict that if an incentive that is 50% higher than a standard incentive is offered to the user, the user is twice as likely to switch payment instruments in order to receive the incentive. The machine learning algorithm may determine that a certain group of users are more likely to switch payment instruments than another group of users. The machine learning algorithm may determine that certain incentives will cause a user to switch payment instruments, while other incentives will not cause a user to switch payment instruments. The machine learning algorithm may determine that a user is more likely to switch payment instruments while interacting with certain types of merchants or events. Any other type of determination about the user purchase behaviors may be provided by the machine learning algorithm.

In the example, a user is identified that is likely to switch payment instruments from one payment instrument to another payment instrument when provided with an incentive at a high spend event. The machine learning algorithm may configure a threshold for the identification. The user may be identified as likely if the user is 51% likely to change payment instruments based on the provided incentive. In another example, the user may be identified as likely if the user is 90% likely to change payment instruments based on the provided incentive. In another example, the user may be identified more likely to change instruments based on the provided incentive than 50% of other users in the database. Any other threshold may be used, such as 40%, 60%, 70%, or 80%. Any other definition or configuration for the identification may be used.

Because the identification of the users is performed by the machine learning algorithm based on data collected by the data acquisition system 120, human analysis or cataloging is not required. The process is performed automatically by the machine learning system 130 without human intervention, as described in the Machine Learning section below. The amount of data typically collected from the payment instrument institution, the third-party providers, and the other data sources includes thousands to tens of thousands of data items for each user. The total number of users may include all of the payment instrument institution clients, all of a cellular provider's clients, all of the users on a social network, or the users from any other third-party provider. Human intervention in the process is not useful or required because the amount of data is too great. A team of humans would not be able to catalog or analyze the data in any useful manner.

In block 240, the incentive system 130 trains the machine learning algorithm of the machine learning system 133 based on at least transaction information, third-party data, and geolocation data of users to classify high spend events.

The details of the method to train the machine learning algorithm are described in greater detail the Machine Learning section below.

As described in the Machine Learning section below, the data stored by the data acquisition system 120 is used to train the machine learning algorithm to create a predictive model of high spend events. Based on the data collected by the data acquisition system 120, the predictive model may be used to predict when high spend events are occurring. High spend events may be events that occur at a specific location with a high number of users or customers at which a high number of transactions occur per user, or at which transactions occur that have a higher value than is typical.

For example, high spend events may include sports events such as a professional baseball game, rock concerts, shopping malls, entertainment districts, festivals, fairs, or conferences. The high spend event may be identified because the event is confined to a specific geographic area, such as inside a sports arena. The high spend event may be specific to a time period, such as during the hours that a concert is occurring. In an example, a location such as a shopping mall may only become a high spend event when business is spiking, such as due to a grand opening or during a holiday shopping season. An entertainment district may only be a high spend event location during weekend evenings. The high spend event may occur at a location that is not typically a spending location, such as for a festival that is in an otherwise unpopulated location.

In block 250, the machine learning system 133 determines that a high spend event is imminent or ongoing based on the output of the machine learning algorithm. The machine learning algorithm processes new data and stored data to identify spending patterns and location patterns.

In an example, the machine learning algorithm recognizes that 3000 users have converged on a plot of land that is not associated with a merchant or business. All of the users are conducting transactions for similar amounts that indicate an admission fee. At least 500 of the users are conducting transactions for food and beverages. The machine learning algorithm recognizes that 300 of the users have conducted transactions for apparel. Based on the data, the machine learning algorithm determines that a high spend event, such as a festival, is occurring.

In another example, the machine learning algorithm recognizes that 5,000 users have purchased tickets to an event at a concert venue for a particular evening. The machine learning algorithm recognizes that users at concerts at that venue typically conduct transactions with a higher than typical cost for food and drinks. The machine learning algorithm determines that the concert venue will be a high spend event from one hour before the time of the concert until one hour after the concert ends.

Because the identification of the users is performed by the machine learning algorithm based on data collected by the data acquisition system 120, human analysis or cataloging is not required. The process is performed automatically by the machine learning system 130 without human intervention, as described in the Machine Learning section below. The amount of data typically collected from the payment instrument institution, the third-party providers, and the other data sources includes thousands to tens of thousands of data items for each user. The total number of users may include all of the payment instrument institution clients, all of a cellular provider's clients, all of the users on a social network, or the users from any other third-party provider. Human intervention in the process is not useful or required because the amount of data is too great. A team of humans would not be able to catalog or analyze the data in any useful manner.

In block 260, the incentive system 130 determines that a particular user is at a high spend event. In an example, the incentive system 130 recognizes that the user has entered a location of a high spend event based on geolocation data. That is, the user's geolocation data places the user inside a venue of a high spend event at a time that the high spend event is ongoing. For example, the user has entered a concert venue at a time that a concert is occurring. In another example, the incentive system 130 recognizes that the user has purchased a ticket to a professional basketball game for a certain data. The incentive system 130 associates the user with that high spend event for the date and time of the game.

In block 270, the incentive system 130 combines the two machine learning outputs of blocks 230 and 260 to identify users that are likely to switch payment instruments while the user is at a high spend event. The incentive system 130 compares the output of the machine learning algorithm that identifies users that are likely to switch payment instruments with an output of the machine learning algorithm that determines which users are at a high spend event. If a user that is likely to switch cards at a high spend event when provided with an incentive is at a high spend event, then that user is identified. The incentive system 130 determines that the identified user should receive an incentive to switch to the payment instrument associated with the incentive system 130.

In an example, the incentive system 130 did not have notice that the user would attend the high spend event. For example, the user did not buy tickets before the event or if the event itself was not planned in advance. The incentive system 130 makes the identification in real-time while the user is at the event and the event is recognized as a high spend event.

In block 280, the incentive system 130 determines a geofence and a time period for the user to receive the incentive. The incentive system 130 may be providing an extra incentive to encourage the user to use the payment instrument while at the high spend event because a higher than typical value of transactions is expected from the user during the event. The incentive system 130 may not want the user to use the incentive away from the high spend event because the value of the transactions may be lower when away from the event.

The incentive system 130 establishes a perimeter or other type of geofence outside of which the incentive is no longer valid. A geofence is a configured border around a geographic area that may be represented on a map, inside of which certain functions of a system are applicable. The incentive must be used to conduct transactions with merchants inside of the geofence. In an example, the geofence may be established as the perimeter of a concert venue or may include the parking areas around the concert venue. In another example, the grounds of a festival may be inside the geofence, but any surrounding areas are outside the geofence. In another example, portions of a shopping mall are inside the geofence, such as at a specific holiday sale location, while other portions of the shopping mall are outside of the geofence. Any suitable geofence guidelines may be utilized.

The incentive system 130 may also limit the time that the incentive is valid. For example, the incentive system 130 may limit the incentive to the day of a festival or the time that a sporting event is occurring. Thus, the incentive may only be used at the high spend event location while the high spend event is occurring.

In block 290, the incentive system 130 presents an incentive to the identified user via a notification. The incentive may be provided in real-time while the user is at the event. For example, if the incentive system 130 recognizes that a high spend event is occurring and the user is at the high spend event, then the incentive system 130 must create and distribute the incentive in real-time to the user computing device 110 to capture the user's attention.

The notification may be provided to the user computing device 110 of the user via the communication application 112. The notification may be displayed to the user on the computing device 110 via the user interface 114. The notification may be provided by a text, an email, a push notification, an instant message, or any other suitable communication method. For example, a push notification may be communicated to the user computing device 110 from the incentive system 130 and displayed as a popup notification on a user interface 114.

The notification may display to the user that a particular incentive is being associated with the high spend event. The notification may provide a specific reward is being provided for purchases with the particular payment instrument associated with the incentive system 130 that occur within the geofence and in the required time period.

For example, the notification may display to the user that a double cash back offer is being provided for any purchase at a sports arena during a game and one hour after the game. In another example, the notification may display to the user that a 5% rebate is being provided for any purchase at a concert venue during a concert through midnight. In another example, the notification may display to the user that double rewards points are being provided for any purchase at a on a festival grounds the week of the festival until 10:00 PM on the following Monday. Any type of incentive may be provided to encourage the user to utilize the payment instrument of the payment instrument institution during the high spend event.

The user may receive the notification and desire to utilize the incentive. The user switches to the payment instrument associated with the incentive when the user next conducts a transaction at the high spend event. The user conducts the transaction and receives the incentive if the transaction meets the incentive rules.

For example, when the user conducts the transaction, the incentive system 130 determines that the transaction is occurring inside the geofence, such as by verifying the location of the user using the geolocation of the user computing device 110 or by verifying the location of the merchant. The incentive system 130 may determine the time of the transaction to ensure that the transaction occurred during the high spend event time period. Any other verification may be made by the incentive system 130.

3. Machine Learning

Machine learning is a field of study within artificial intelligence that allows computers to learn functional relationships between inputs and outputs without being explicitly programmed.

The term "Artificial Intelligence" refers to a quantitative method, system, or approach ("techniques") that emulates human intelligence via computer programs. These can be used to make estimates, predictions, recommendations, or decisions in manners that go beyond classical, statistical, mathematical, econometric, or financial approaches.

Machine learning is the subset of AI that derives representations or inferences from data without explicitly programming every parameter representation or computer step (for example, Random Forest or Artificial Neural Network based algorithm approaches). In contrast, AI techniques that are not members of the machine learning subset include techniques such as fuzzy logic, complex dependency parsing techniques for natural language processing.

Machine learning involves a module comprising algorithms that may learn from existing data by analyzing, categorizing, or identifying the data. Such machine-learning algorithms operate by first constructing a model from training data to make predictions or decisions expressed as outputs. In example embodiments, the training data includes data for one or more identified features and one or more outcomes, for example using user purchasing histories and geolocations to offer real-time incentives for purchases with a payment instrument to an identified high spend event to users likely to switch payment instruments. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression is highly dependent on choosing informative, discriminating, and independent features. Features may comprise numerical data, categorical data, time-series data, strings, graphs, or images.

In general, there are two categories of machine learning problems: classification problems and regression problems. Classification problems, also referred to as categorization problems, aim at classifying items into discrete category values. Training data teaches the classifying algorithm how to classify. In example embodiments, features to be categorized may include transaction data, which can be provided to the classifying machine learning algorithm and then placed into categories of, for example, transactions with payment instrument X, transactions at geolocation Y, or incentives provided that prompted a change in payment instrument. Regression algorithms aim at quantifying and correlating one or more features. Training data teaches the regression algorithm how to correlate the one or more features into a quantifiable value.

a. Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, features such as geolocation can be mapped to vectors implemented in embedding methods. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

b. Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use. In one aspect, the training data used to teach the machine learning module can comprise input data such as user transaction histories and geolocations and the respective target output data such as whether a user is likely to change payment instruments while at a high spend event.

(i) Unsupervised and Supervised Learning

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

(ii) Semi-Supervised and Reinforcement Learning

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value and the machine learning module is developed to maximize the numerical value of the reward signal. In addition, reinforcement learning can adopt a value function that provides a numerical value representing an expected total of the numerical values provided by the reward signal over time.

(iii) Transfer Learning

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

(iv) Incremental and Curriculum Learning

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

(v) Learning to Learn

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

(vi) Contrastive Learning

In example embodiment, contrastive learning is implemented. Contrastive learning is a self-supervised model of learning in which training data is unlabeled is considered as a form of learning in-between supervised and unsupervised learning. This method learns by contrastive loss, which separates unrelated (i.e., negative) data pairs and connects related (i.e., positive) data pairs. For example, to create positive and negative data pairs, more than one view of a datapoint, such as rotating an image or using a different time-point of a video, is used as input. Positive and negative pairs are learned by solving dictionary look-up problem. The two views are separated into query and key of a dictionary. A query has a positive match to a key and negative match to all other keys. The machine learning module then learns by connecting queries to their keys and separating queries from their non-keys. A loss function, such as those described herein, is used to minimize the distance between positive data pairs (e.g., a query to its key) while maximizing the distance between negative data points. See e.g., Tian, Yonglong, et al. "What makes for good views for contrastive learning?" Advances in Neural Information Processing Systems 33 (2020): 6827-6839.

(vii) Pre-Trained Learning

In example embodiments, the machine learning module is pre-trained. A pre-trained machine learning model is a model that has been previously trained to solve a similar problem. The pre-trained machine learning model is generally pre-trained with similar input data to that of the new problem. A pre-trained machine learning model further trained to solve a new problem is generally referred to as transfer learning, which is described herein. In some instances, a pre-trained machine learning model is trained on a large dataset of related information. The pre-trained model is then further trained and tuned for the new problem. Using a pre-trained machine learning module provides the advantage of building a new machine learning module with input neurons/nodes that are already familiar with the input data and are more readily refined to a particular problem. See e.g., Diamant N, et al. Patient contrastive learning: A performant, expressive, and practical approach to electrocardiogram modeling. PLoS Comput Biol. 2022 Feb. 14; 18(2): e1009862.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, produce, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results. In example embodiments, input data can comprise transaction histories and geolocations and, when provided to a trained machine learning module, results in output data such as users that are likely to change payment instruments at high sales events. The output can then be provided to the incentive system to use in determining what incentives to offer to certain users. As such, the identification-related technical problem of determining when a user that is likely to change payment instruments is at a high spend event can be solved using the herein-described techniques that utilize machine learning to produce outputs of when high spend events are occurring, what users should be targeted, and what incentives should be provided.

c. Algorithms

Different machine-learning algorithms have been contemplated to carry out the embodiments discussed herein. For example, linear regression (LiR), logistic regression (LoR), Bayesian networks (for example, naive-bayes), random forest (RF) (including decision trees), neural networks (NN) (also known as artificial neural networks), matrix factorization, a hidden Markov model (HMM), support vector machines (SVM), K-means clustering (KMC), K-nearest neighbor (KNN), a suitable statistical machine learning algorithm, and/or a heuristic machine learning system for classifying or evaluating whether a user is likely to change payment instruments while at a high spend event.

The methods described herein can be implemented with more than one machine learning method. The machine learning system can use a combination of machine learning algorithms. The machine learning algorithms may be of the same type or of different types. For example, a first machine learning algorithm may be trained for a first type of result, while a second machine learning algorithm may be trained for a second type of result. In certain examples, the first type of result may be an input into the second machine learning algorithm, while in other examples, the two results are combined to produce a third result. In certain examples, the first and second types of results are both inputs into a third machine learning algorithm that produces the third result.

(i) Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be y=mx+b. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved. In example embodiments, user transaction histories and geolocations are used as the independent variables to train a LiR machine learning module, which, after training, is used to estimate, for example, whether a user is likely to change payment instruments while at a high spend event.

(ii) Logistic Regression (LoR)

In one example embodiment, logistic regression machine learning is implemented. Logistic Regression, often considered a LiR type model, is typically used in machine learning to classify information, such as user transaction histories and geolocations into categories such as whether a user is likely to change payment instruments while at a high spend event. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process. In example embodiments, user transaction histories and geolocations are used as the independent variables to train a LoR machine learning module, which, after training, is used to estimate, for example, whether a user is likely to change payment instruments while at a high spend event.

(iii) Bayesian Network

In one example embodiment, a Bayesian Network is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node the probability of the input features resulting in the connected node is learned and forms the predictive mechanism. The nodes may comprise the same, similar or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are mentioned for demonstrative purposes. The first method involves computing the joint probability of a particular assignment of values for each variable. The joint probability can be considered the product of each conditional probability and, in some instances, comprises the logarithm of that product. The second method is Markov chain Monte Carlo (MCMC), which can be implemented when the sample size is large. MCMC is a well-known class of sample distribution algorithms and will not be discussed in detail herein.

The assumption of conditional independence of variables forms the basis for Naïve Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate. In example embodiments, user transaction histories and geolocations are mapped to the BN graph to train the BN machine learning module, which, after training, is used to estimate whether a user is likely to change payment instruments while at a high spend event.

(iv) Random Forest

In one example embodiment, random forest ("RF") is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, user transaction histories and geolocations are used to train the nodes of the decision trees of a RF machine learning module, which, after training, is used to estimate whether a user is likely to change payment instruments while at a high spend event.

(A) Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding underperforming nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function. In an example embodiment, a decision tree is implemented to determine a user transaction histories and geolocations and gradient boosting is applied to the tree to improve its ability to accurately determine whether a user is likely to change payment instruments while at a high spend event.

(v) Neural Networks

In one example embodiment, Neural Networks are implemented. NNs are a family of statistical learning models influenced by biological neural networks of the brain. NNs can be trained on a relatively-large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN for user transaction histories and geolocations is defined by a set of input neurons that can be given input data such as user transaction histories and geolocations. The input neuron weighs and transforms the input data and passes the result to other neurons, often referred to as "hidden" neurons. This is repeated until an output neuron is activated. The activated output neuron produces a result. In example embodiments, user transaction histories and secondary user actions or data are used to train the neurons in a NN machine learning module, which, after training, is used to estimate whether a user is likely to change payment instruments while at a high spend event.

(A) Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning. In example embodiments, the convolutional autoencoder is a variational convolutional autoencoder. In example embodiments, features from an user transaction histories and geolocations are used as an input signal into a CAE which reconstructs that signal into an output such as a whether a user is likely to change payment instruments while at a high spend event.

(B) Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. In example embodiments, user transaction histories and geolocations are used to train the neurons of a deep learning module, which, after training, is used to estimate whether a user is likely to change payment instruments while at a high spend event.

(C) Convolutional Neural Network (CNN)

In an example embodiment, a convolutional neural network is implemented. CNNs is a class of NNs further attempting to replicate the biological neural networks, but of the animal visual cortex. CNNs process data with a grid pattern to learn spatial hierarchies of features. Wherein NNs are highly connected, sometimes fully connected, CNNs are connected such that neurons corresponding to neighboring data (e.g., pixels) are connected. This significantly reduces the number of weights and calculations each neuron must perform.

In general, input data, such user transaction histories and geolocations, comprises of a multidimensional vector. A CNN, typically, comprises of three layers: convolution, pooling, and fully connected. The convolution and pooling layers extract features and the fully connected layer combines the extracted features into an output, such as whether a user is likely to change payment instruments while at a high spend event.

In particular, the convolutional layer comprises of multiple mathematical operations such as of linear operations, a specialized type being a convolution. The convolutional layer calculates the scalar product between the weights and the region connected to the input volume of the neurons. These computations are performed on kernels, which are reduced dimensions of the input vector. The kernels span the entirety of the input. The rectified linear unit (i.e., ReLu) applies an elementwise activation function (e.g., sigmoid function) on the kernels.

CNNs can optimized with hyperparameters. In general, there three hyperparameters are used: depth, stride, and zero-padding. Depth controls the number of neurons within a layer. Reducing the depth may increase the speed of the CNN but may also reduce the accuracy of the CNN. Stride determines the overlap of the neurons. Zero-padding controls the border padding in the input.

The pooling layer down-samples along the spatial dimensionality of the given input (i.e., convolutional layer output), reducing the number of parameters within that activation. As an example, kernels are reduced to dimensionalities of 2×2 with a stride of 2, which scales the activation map down to 25%. The fully connected layer uses inter-layer-connected neurons (i.e., neurons are only connected to neurons in other layers) to score the activations for classification and/or regression. Extracted features may become hierarchically more complex as one layer feeds its output into the next layer. See O'Shea, K.; Nash, R. An Introduction to Convolutional Neural Networks. arXiv 2015 and Yamashita, R., et al Convolutional neural networks: an overview and application in radiology. Insights Imaging 9, 611-629 (2018).

(D) Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. For example, input such as user transaction histories and geolocations is received by a RNN, which determines whether a user is likely to change payment instruments while at a high spend event. See Sherstinsky, Alex. "Fundamentals of recurrent neural network (RNN) and long short-term memory (LSTM) network." Physica D: Nonlinear Phenomena 404 (2020): 132306.

(1) Long Short-term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU. See Zhu, Xiaodan, et al. "Long short-term memory over recursive structures." International Conference on Machine Learning. PMLR, 2015.

(vi) Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features, and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, user transaction histories and geolocations are used to train the relationship matrix R in a matrix factorization machine learning module. After training, the relationship matrix R and input matrix F, which comprises vector representations of user transaction histories and geolocations, results in the prediction matrix P comprising whether a user is likely to change payment instruments while at a high spend event.

(vii) Hidden Markov Model

In example embodiments, a hidden Markov model is implemented. An HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. An HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix No; wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences. In example embodiments, user transaction histories and geolocations are used to train the nodes/states of the HMM machine learning module, which, after training, is used to estimate whether a user is likely to change payment instruments while at a high spend event.

(viii) Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of a SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal. In example embodiments, user transaction histories and geolocations are used to train the linear equation or kernel function of the SVM machine learning module, which, after training, is used to estimate whether a user is likely to change payment instruments while at a high spend event.

(ix) K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, user transaction histories and geolocations are used to train the centroids of a KMC machine learning module, which, after training, is used to estimate whether a user is likely to change payment instruments while at a high spend event.

(x) K-nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is 1 and a Markov model approach is utilized. In example embodiments, user transaction histories and geolocations are used to train a KNN machine learning module, which, after training, is used to estimate whether a user is likely to change payment instruments while at a high spend event.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the modules described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

4. Multimodal Translation

In an example embodiment, the machine learning module comprises multimodal translation (MT), also known as multimodal machine translation or multimodal neural machine translation. MT comprises of a machine learning module capable of receiving multiple (e.g. two or more) modalities. Typically, the multiple modalities comprise of information connected to each other.

In example embodiments, the MT may comprise of a machine learning method further described herein. In an example embodiment, the MT comprises a neural network, deep neural network, convolutional neural network, convolutional autoencoder, recurrent neural network, or an LSTM. For example, one or more microscopy imaging data comprising multiple modalities from a subject is embedded as further described herein. The embedded data is then received by the machine learning module. The machine learning module processes the embedded data (e.g. encoding and decoding) through the multiple layers of architecture then determines the corresponding the modalities comprising the input. The machine learning methods further described herein may be engineered for MT wherein the inputs described herein comprise of multiple modalities. See e.g. Sulubacak, U., Caglayan, O., Grönroos, S A. et al. Multimodal machine translation through visuals and speech. Machine Translation 34, 97-147 (2020) and Huang, Xun, et al. "Multimodal unsupervised image-to-image translation." Proceedings of the European conference on computer vision (ECCV). 2018.

The ladder diagrams, scenarios, flowcharts and block diagrams in the figures and discussed herein illustrate architecture, functionality, and operation of example embodiments and various aspects of systems, methods, and computer program products of the present invention. Each block in the flowchart or block diagrams can represent the processing of information and/or transmission of information corresponding to circuitry that can be configured to execute the logical functions of the present techniques. Each block in the flowchart or block diagrams can represent a module, segment, or portion of one or more executable instructions for implementing the specified operation or step. In example embodiments, the functions/acts in a block can occur out of the order shown in the figures and nothing requires that the operations be performed in the order illustrated. For example, two blocks shown in succession can executed concurrently or essentially concurrently. In another example, blocks can be executed in the reverse order. Furthermore, variations, modifications, substitutions, additions, or reduction in blocks and/or functions may be used with any of the ladder diagrams, scenarios, flow charts and block diagrams discussed herein, all of which are explicitly contemplated herein.

The ladder diagrams, scenarios, flow charts and block diagrams may be combined with one another, in part or in whole. Coordination will depend upon the required functionality. Each block of the block diagrams and/or flowchart illustration as well as combinations of blocks in the block diagrams and/or flowchart illustrations can be implemented by special purpose hardware-based systems that perform the aforementioned functions/acts or carry out combinations of special purpose hardware and computer instructions. Moreover, a block may represent one or more information transmissions and may correspond to information transmissions among software and/or hardware modules in the same physical device and/or hardware modules in different physical devices.

The present techniques can be implemented as a system, a method, a computer program product, digital electronic circuitry, and/or in computer hardware, firmware, software, or in combinations of them. The system may comprise distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors.

5. Example Computing Device

FIG. 3 depicts a block diagram of a computing machine 2000 and a module 2050 in accordance with certain examples. The computing machine 2000 may comprise, but is not limited to, remote devices, work stations, servers, computers, general purpose computers, Internet/web appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and any machine capable of executing the instructions. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The one or more embodiments of processor 2010 may be configured to execute code or instructions to perform the operations and functionality described herein, manage request flow and address mappings, and to perform calculations and generate commands. Such code or instructions could include, but is not limited to, firmware, resident software, microcode, and the like. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), tensor processing units (TPUs), a graphics processing unit ("GPU"), a field programmable gate array ("FPGA"), a programmable logic device ("PLD"), a radio-frequency integrated circuit (RFIC), a controller, a state machine, gated logic, discrete hardware components, any other processing unit, or any combination or multiplicity thereof. In example embodiments, each processor 2010 can include a reduced instruction set computer (RISC) microprocessor. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines. Processors 2010 are coupled to system memory and various other components via a system bus 2020.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 is coupled to system bus 2020 and can include a basic input/output system (BIOS), which controls certain basic functions of the processor 2010 and/or operate in conjunction with, a non-volatile storage device such as the storage media 2040.

In example embodiments, the computing device 2000 includes a graphics processing unit (GPU) 2090. Graphics processing unit 2090 is a specialized electronic circuit designed to manipulate and alter memory to accelerate the creation of images in a frame buffer intended for output to a display. In general, a graphics processing unit 2090 is efficient at manipulating computer graphics and image processing and has a highly parallel structure that makes it more effective than general-purpose CPUs for algorithms where processing of large blocks of data is done in parallel.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any electromagnetic storage device, any semiconductor storage device, any physical-based storage device, any removable and non-removable media, any other data storage device, or any combination or multiplicity thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The module 2050 may comprise one or more hardware or software elements, as well as an operating system, configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. Each of the operating system, one or more application programs, other program modules, and program data or some combination thereof, may include an implementation of a networking environment. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for coupling in operation the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including cursor control devices, touch-screens, scanners, electronic digitizers, sensors, receivers, touchpads, trackballs, cameras, microphones, alphanumeric input devices, any other pointing devices, or any combinations thereof. The I/O interface 2060 may couple the computing machine 2000 to various output devices including video displays (The computing device 2000 may further include a graphics display, for example, a plasma display panel (PDP), a light emitting diode (LED) display, a liquid crystal display (LCD), a projector, a cathode ray tube (CRT), or any other display capable of displaying graphics or video), audio generation device, printers, projectors, tactile feedback devices, automation control, robotic components, actuators, motors, fans, solenoids, valves, pumps, transmitters, signal emitters, lights, and so forth. The I/O interface 2060 may couple the computing device 2000 to various devices capable of input and out, such as a storage unit. The devices can be interconnected to the system bus 2020 via a user interface adapter, which can include, for example, a Super I/O chip integrating multiple device adapters into a single integrated circuit.

The computing machine 2000 may operate in a networked environment using logical connections through the network interface 2070 to one or more other systems or computing machines across the network 2080. The network 2080 may include a local area network ("LAN"), a wide area network ("WAN"), an intranet, an Internet, a mobile telephone network, storage area network ("SAN"), personal area network ("PAN"), a metropolitan area network ("MAN"), a wireless network ("WiFi;"), wireless access networks, a wireless local area network ("WLAN"), a virtual private network ("VPN"), a cellular or other mobile communication network, Bluetooth, near field communication ("NFC"), ultra-wideband, wired networks, telephone networks, optical networks, copper transmission cables, or combinations thereof or any other appropriate architecture or system that facilitates the communication of signals and data. The network 2080 may be packet switched, circuit switched, of any topology, and may use any communication protocol. The network 2080 may comprise routers, firewalls, switches, gateway computers and/or edge servers. Communication links within the network 2080 may involve various digital or analog communication media such as fiber optic cables, free-space optics, waveguides, electrical conductors, wireless links, antennas, radio-frequency communications, and so forth.

Information for facilitating reliable communications can be provided, for example, as packet/message sequencing information, encapsulation headers and/or footers, size/time information, and transmission verification information such as cyclic redundancy check (CRC) and/or parity check values. Communications can be made encoded/encrypted, or otherwise made secure, and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure and then decrypt/decode communications.

The processor 2010 may be connected to the other elements of the computing machine 2000 or the various peripherals discussed herein through the system bus 2020. The system bus 2020 represents one or more of any of several types of bus structures, including a memory bus or memory controller, a peripheral bus, an accelerated graphics port, and a processor or local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those ordinarily skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

A "server" may comprise a physical data processing system (for example, the computing device 2000 as shown in FIG. 3) running a server program. A physical server may or may not include a display and keyboard. A physical server may be connected, for example by a network, to other computing devices. Servers connected via a network may operate in the capacity of a server machine or a client machine in a server-client network environment, or as a peer machine in a distributed (e.g., peer-to-peer) network environment. The computing device 2000 can include clients' servers. For example, a client and server can be remote from each other and interact through a network. The relationship of client and server arises by virtue of computer programs in communication with each other, running on the respective computers.

The example systems, methods, and acts described in the examples and described in the figures presented previously are illustrative, not intended to be exhaustive, and not meant to be limiting. In alternative examples, certain acts can be performed in a different order, in parallel with one another, omitted entirely, and/or combined between different examples, and/or certain additional acts can be performed, without departing from the scope and spirit of various examples. Plural instances may implement components, operations, or structures described as a single instance. Structures and functionality that may appear as separate in example embodiments may be implemented as a combined structure or component. Similarly, structures and functionality that may appear as a single component may be implemented as separate components. Accordingly, such alternative examples are included in the scope of the following claims, which are to be accorded the broadest interpretation to encompass such alternate examples. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for assigning a resource magnifier, the system comprising:
    one or more processors; and
    one or more memories configured to store instructions that when executed by the one or more processors perform operations comprising:
        receiving, in near real-time, a plurality of permission messages associated with a plurality of actions, wherein each permission message of the plurality of permission messages is associated with a corresponding user action, and wherein each permission message comprises a plurality of permission parameters, the plurality of permission parameters comprising a resource indicator, an permission timestamp indicating a generation time of a corresponding permission message, and a corresponding location associated with each permission message;
        inputting the plurality of permission messages into a first machine learning model to obtain one or more resource intensive events, wherein the first machine learning model has been trained to identify, based on permission messages, resource intensive events, and wherein each resource intensive event is associated with the corresponding location;
        determining, based on the one or more resource intensive events, one or more locations associated with the one or more resource intensive events;
        determining, based on user device locations, a plurality of users within a threshold distance of a first resource intensive event of the one or more resource intensive events;
        inputting user data associated with the plurality of users into a second machine learning model to obtain a subset of users who are predicted to switch from a first permission token to a second permission token when a corresponding resource multiplier is assigned to the second permission token, and wherein the second machine learning model is trained to identify, based on received user data, whether a user is predicted to switch from one permission token to another permission token;
        transmitting to a plurality of client devices associated with the plurality of users a corresponding indication of the corresponding resource multiplier;
        receiving, for one or more users of the plurality of users, data indicating whether the one or more users switched from the first permission token to the second permission token;
        generating a training dataset based on the data indicating whether each user switched from the first permission token to the second permission token; and
        retraining the second machine learning model using the training dataset.

2. The system of claim 1, wherein the instructions for inputting the plurality of permission messages into the first machine learning model to obtain the one or more resource intensive events further cause the one or more processors to perform operations comprising:
    extracting, from the plurality of permission messages, a plurality of timestamps and a corresponding plurality of location identifiers; and
    executing the first machine learning model on the plurality of timestamps and the corresponding plurality of location identifiers, wherein the first machine learning model clusters each entry according to a combination of a timestamp and a location.

3. The system of claim 1, wherein the first machine learning model outputs one or more clusters comprising a time period and a location, wherein each cluster represents a resource intensive event.

4. The system of claim 3, wherein the instructions for determining, based on the user device locations, the plurality of users within the threshold distance of the first resource intensive event of the one or more resource intensive events further cause the one or morn processors to perform operations comprising:
    retrieving cluster data for a first cluster of the one or more clusters;
    determining, based on the cluster data, a cluster area associated with the first cluster;
    identifying, based on an event database, an event within the cluster area;
    determining, based on event data associated with the event, a time interval associated with the event; and
    based on determining that the event has not ended, identifying a plurality of user devices present within the cluster area.

5. The system of claim 1, wherein the instructions further cause the one or more processors to perform operations comprising:
    receiving, from the second machine learning model for each user that is predicted to switch from the first permission token to the second permission token, a corresponding resource multiplier threshold for switching from the first permission token to the second permission token;
generating the corresponding resource multiplier for each user for a period of time associated with a resource intensive event of the one or more resource intensive events; and
adding the corresponding resource multiplier to the corresponding indication.

6. The system of claim 5, wherein the instructions further cause the one or more processors to perform operations comprising:
receiving, from the second machine learning model for each user that is predicted to switch from the first permission token to the second permission token, a corresponding resource type threshold for switching from the first permission token to the second permission token;
generating a corresponding resource type for each user for the period of time associated with the resource intensive event; and
adding the corresponding resource type to the corresponding indication.

7. The system of claim 1, wherein the instructions further cause the one or more processors to perform operations comprising:
determining, for each user of the one or more users a corresponding resource multiplier threshold, and a corresponding resource type; and
retraining the second machine learning model using the training dataset.

8. A method comprising:
receiving a plurality of permission messages associated with a plurality of actions, wherein each permission message of the plurality of permission messages is associated with a corresponding user action;
inputting the plurality of permission messages into a first machine learning model to obtain one or more resource intensive events, wherein the first machine learning model has been trained to identify, based on permission messages, resource intensive events, and wherein each resource intensive event is associated with a corresponding location;
determining, based on the one or more resource intensive events, one or morn locations associated with the one or more resource intensive events;
determining, based on user device data, a plurality of users associated with a first resource intensive event of the one or more resource intensive events;
inputting user data associated with the plurality of users into a second machine learning model to obtain a subset of users who are predicted to switch from a first permission token to a second permission token, wherein the second machine learning model is trained to identify, based on received user data, whether a user is predicted to switch from one permission token to another permission token;
transmitting to a plurality of client devices associated with the plurality of users a request to switch from the first permission token to the second permission token, wherein the request comprises a corresponding resource multiplier;
receiving, for one or more users of the plurality of users, data indicating whether the one or more users switched from the first permission token to the second permission token;
generating a training dataset based on the data indicating whether each user switched from the first permission token to the second permission token; and
retraining the second machine learning model using the training dataset.

9. The method of claim 8, wherein inputting the plurality of permission messages into the first machine learning model to obtain the one or more resource intensive events comprises:
extracting, from the plurality of permission messages, a plurality of timestamps and a corresponding plurality of location identifiers; and
executing the first machine learning model on the plurality of timestamps and the corresponding plurality of location identifiers, wherein the first machine learning model clusters each entry according to a combination of a timestamp and a location.

10. The method of claim 8, wherein the first machine learning model outputs one or more clusters comprising a time period and a location, wherein each cluster represents a resource intensive event.

11. The method of claim 10, wherein determining, based on the user device data, the plurality of users associated with the first resource intensive event of the one or more resource intensive events comprises:
retrieving cluster data for a first cluster of the one or more clusters;
determining, based on the cluster data, a cluster area associated with the first cluster;
identifying, based on an event database, an event within the cluster area;
determining, based on event data associated with the event, a time interval associated with the event; and
based on determining that the event has not ended, identifying a plurality of user devices present within the cluster area.

12. The method of claim 8, further comprising:
receiving, from the second machine learning model for each user that is predicted to switch from the first permission token to the second permission token, a corresponding resource multiplier threshold for switching from the first permission token to the second permission token;
generating the corresponding resource multiplier for each user for a period of time associated with a resource intensive event of the one or more resource intensive events; and
adding the corresponding resource multiplier to each indication.

13. The method of claim 12, further comprising:
receiving, from the second machine learning model for each user that is predicted to switch from the first permission token to the second permission token, a corresponding resource type threshold for switching from the first permission token to the second permission token;
generating a corresponding resource type for each user for the period of time associated with the resource intensive event; and
adding the corresponding resource type to each corresponding.

14. The method of claim 8, further comprising:
determining, for each user of the one or more users a corresponding resource multiplier threshold, and a corresponding resource type; and
retraining the second machine learning model using the training dataset.

15. One or more non-transitory, computer-readable media storing instructions that when executed by one or more processors perform operations comprising:

receiving a plurality of permission messages associated with a plurality of actions, wherein each permission message of the plurality of permission messages is associated with a corresponding user action;

inputting the plurality of permission messages into a first machine learning model to obtain one or more resource intensive events, wherein the first machine learning model has been trained to identify, based on permission messages, resource intensive events, and wherein each resource intensive event is associated with a corresponding location;

determining, based on the one or more resource intensive events, one or more locations associated with the one or more resource intensive events;

determining, based on user device locations, a plurality of users within a threshold distance of a first resource intensive event of the one or more resource intensive events;

inputting user data associated with the plurality of users into a second machine learning model to obtain a subset of users who are predicted to switch from a first permission token to a second permission token, wherein the second machine learning model is trained to identify, based on received user data, whether a user is predicted to switch from one permission token to another permission token;

transmitting to a plurality of client devices associated with the plurality of users a request to switch from the first permission token to the second permission token, wherein the request comprises a corresponding resource multiplier;

receiving, for one or more users of the plurality of users, data indicating whether the one or more users switched from the first permission token to the second permission token;

generating a training dataset based on the data indicating whether each user switched from the first permission token to the second permission token; and retraining the second machine learning model using the training dataset.

16. The one or more non-transitory, computer-readable media of claim 15, wherein the instructions inputting the plurality of permission messages into the first machine learning model to obtain the one or more resource intensive events further cause the one or more processors to:

extracting, from the plurality of permission messages, a plurality of timestamps and a corresponding plurality of location identifiers; and executing the first machine learning model on the plurality of timestamps and the corresponding plurality of location identifiers, wherein the first machine learning model clusters each entry according to a combination of a timestamp and a location.

17. The one or more non-transitory, computer-readable media of claim 15, wherein the first machine learning model outputs one or more clusters comprising a time period and a location, wherein each cluster represents a resource intensive event.

18. The one or more non-transitory, computer-readable media of claim 17, wherein the instructions for determining, based on the user device locations, the plurality of users within the threshold distance of the first resource intensive event of the one or more resource intensive events further cause the one or more processors to perform operations comprising:

retrieving cluster data for a first cluster of the one or more clusters;

determining, based on the cluster data, a cluster area associated with the first cluster;

identifying, based on an event database, an event within the cluster area;

determining, based on event data associated with the event, a time interval associated with the event; and based on determining that the event has not ended, identifying a plurality of user devices present within the cluster area.

19. The one or more non-transitory, computer-readable media of claim 15, wherein the instructions further cause the one or more processors to perform operations comprising:

receiving, from the second machine learning model for each user that is predicted to switch from the first permission token to the second permission token, a corresponding resource multiplier threshold for switching from the first permission token to the second permission token;

generating the corresponding resource multiplier for each user for a period of time associated with a resource intensive event of the one or more resource intensive events; and adding the corresponding resource multiplier to each indication.

20. The one or more non-transitory, computer-readable media of claim 19, wherein the instructions further cause the one or more processors to perform operations comprising:

receiving, from the second machine learning model for each user that is predicted to switch from the first permission token to the second permission token, a corresponding resource type threshold for switching from the first permission token to the second permission token;

generating a corresponding resource type for each user for the period of time associated with the resource intensive event; and adding the corresponding resource type to each corresponding.

* * * * *